3,358,010
BIURET POLYISOCYANATES
J. W. Britain, New Martinsville, W. Va., assignor to Mobay Chemical Company, Pittsburgh, Pa., a corporation of Delaware
No Drawing. Filed Mar. 11, 1964, Ser. No. 351,241
12 Claims. (Cl. 260—453)

ABSTRACT OF THE DISCLOSURE

Biuret polyisocyanates are prepared by reacting at least 2.5 mols of an aliphatic or alicyclic diisocyanate with 1 mol of a monohydric tertiary alcohol at a temperature of about 70° C. to about 205° C. The biuret polyisocyanates form without the formation of solid by-products which clog the reactor in which the material is made.

---

This invention relates to organic polyisocyanates and particularly isocyanates containing biuret groups. More particularly, it relates to a method of preparing such polyisocyanates.

tI has been heretofore known to prepare biuret polyisocyanates by reacting organic polyisocyanates with water or hydrogen sulphide. In these procedures, a diisocyanatourea product is first formed and then the biuret polyisocyanate is formed by reaction of other molecules of the isocyanate with the active hydrogen of the urea compound resulting in a biuret polyisocyanate. These processes, however, are accompanied by a serious disadvantage because of solids formation which tend to clog the apparatus in which the process is conducted. In actual production, it is necessary to shut down the plant weekly in order to clean out this solids formation. This seriously results in low efficiency and hampers the output of the particular system.

It is therefore an object of this invention to provide an improved method of preparing biuret polyisocyanates. It is another object of this invention to provide a method of preparing biuret polyisocyanates that do not result in solids formation. It is still another object of this invention to provide a method of preparing biuret polyisocyanates which eliminate the need for shutting down operation of the plant.

The foregoing objects and others which will become apparent from the following description are accomplished in accordance with the invention, generally speaking, by providing a method of preparing biuret polyisocyanates wherein at least 2.5 mols of an aliphatic or alicyclic diisocyanate are reacted with one mol of a monohydric tertiary alcohol at a temperature of from about 70° C. to about 205° C. Thus, the invention contemplates the reaction of an aliphatic diisocyanate or an alicyclic diisocyanate with a tertiary alcohol where the reactants are present in an amount of at least 2.5 molecules of the diisocyanate per molecule of the tertiary alcohol. In the preparation of biuret polyisocyanates, the reaction proceeds first by the formation of an unsaturated aliphatic hydrocarbon, the release of $CO_2$ and the formation of a diisocyanatourea which again reacts through the active hydrogen of the urea group to form the biuret polyisocyanate. It has surprisingly been found that by this method, substantially no solids formation results. The unsaturated hydrocarbon can be separated out by condensation as a by-product. The carbon dioxide fromed can be readily recovered by suitable absorbers such as ascarite absorbers and the product is obtained in the reaction vessel in which the reactants are initially introduced. The quantity of carbon dioxide recovered gives an indication of how the reaction is progressing.

The olefin which is initially formed passes from the reaction vessel as a vapor and can be condensed and recovered. The reaction proceeds simply and directly. The product is readily recovered in the liquid form without any substantial amount of solids formation.

In accordance with this invention, at least 2.5 mols of aliphatic or alicyclic diisocyanate per mol of tertiary alcohol is initially introduced into a suitable reaction vessel which is heated to a temperature of at least about 70° C. It is preferred that at least 3 mols or diisocyanate per mol of tertiary alcohol be used. For best results, 9 mols of diisocyanate per mol of tertiary alcohol should be used. When an extreme excess quantity of diisocyanate is used, it may be desirable to separate the unreacted diisocyanate from the biuret polyisocyanate product. This can be achieved by any suitable technique such as, for example, distillation, extraction and the like. It is preferred that if distillation is used, a system which is rapid and does not subject the product to high temperatures for long periods of time be used. Suitable systems which achieve this result are, for example, flash distillation apparatus and thin filmed evaporators. It is pointed out for clarity, that when lower amounts of diisocyanate are used, for example, from 2.5 mol to 3 mols of diisocyanate per mol of tertiary alcohol, there is generally no need for separation of unreacted diisocyanate from the biuret product. Even when higher amounts of diisocyanate are used, it may be desirable to use the product obtained in an unseparated condition. Thus, for some applications, it may be desirable to use this mixture of unreacted aliphatic diisocyanate and biuret polyisocyanates. However, it is generally preferred to remove the unreacted diisocyanate to achieve a low volatile non-toxic biuret polyisocyanate.

In accordance with the invention, temperatures of at least 70° C. must be achieved before biuret polyisocyanate is formed. It is preferred, however, that the temperature be maintained at from about 150° C. to about 205° C. It is important that the temperature of about 205° C. is not exceeded because of the active hydrogen atoms remaining in the biuret polyisocyanate. These biuret polyisocyanates have the formula

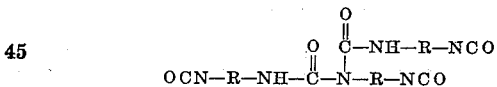

wherein R is the aliphatic or alicyclic portion of the diisocyanate. When temperatures above 205° C. are permitted, the excess quantity of isocyanate will react with the biuret hydrogen atoms thus resulting in higher functional isocyanates. These products are generally undesirable for the reason that solidification results and the applications to which the biuret polyisocyanate can be put are limited.

Any suitable aliphatic diisocyanate or alicyclic diisocyanate may be used in the process of this invention such as, for example, ethylidene diisocyanate, butylene diisocyanate, pentamethylene diisocyanate, hexamethylene diisocyanate, cyclopentylene-1,3-diisocyanate, cyclohexylene-1,4-diisocyanate, cyclohexylene-1,2-diisocyanate, hexahydroxylylene diisocyanate, dichlorohexamethylene diisocyanate, dicyclohexyl-4,4'-diisocyanate, 1,2-di(isocyanato methyl) cyclobutane, transvinylene diisocyanate, aliphatic diisocyanates containing ether groups such as 1,3-bis(γ-isocyanatopropoxy)-2,2-dimethylpropane, 1,3-bis(γ-isocyanatopropoxy-2-methyl-2-propyl propane and the like; 1-methyl-2,4-diisocyanatocyclohexane, 1-methyl-2,6-diisocyanatocyclohexane, mixtures of 1-methyl-2,4-diisocyanatocyclohexane and 1-methyl-2,6-diisocyanatocyclohexane bis(4-isocyanatocyclohexyl)methane, 1,4-diisocyanatocyclohexane, 1,3-diisocyanatocyclohexane and the like.

Any suitable monohydric tertiary alcohol may be used such as, for example, tertiary butyl alcohol, 2-methyl-2-butanol, 2-methyl-2-pentanol, 3-methyl-3-pentanol, 3-ethyl-3-pentanol, 3-ethyl-3-nonanol, 3-methyl-1-butyn-3-ol, 3-methyl-1-pentyn-3-ol, 3,5-dimethyl-1-hexyn-3-ol, 1-methyl-cyclo pentanol, 1-methyl-cyclohexanol, 1-ethyl-cyclohexanol, 1,1-diphenylethanol, 1,1,2-triphenylethanol and the like.

While it is not necessary in order to practice the process of this invention, certain catalysts may be used in order to accelerate the reaction. Any suitable acid catalyst, such as, for example, boron trifluoride, sulphuric acid, phosphoric acid, phosphorus acid, hydrochloric acid, aluminum trichloride and the like may be used.

The reaction is preferably conducted in the melt, however, if desired, a suitable solvent which is inert with respect to the reactants such as, for example, dioxane, tetrahydrofuran, triethyleneglycol diacetate, toluene, benzene, chlorobenzene, ortho-dichlorobenzene, butyl acetate, ethylene glycol monoethyl ether acetate, methylene chloride and the like may be used.

The invention is further illustrated but not limited by the following examples in which parts are by weight unless otherwise specified.

*Example 1*

Into a round bottom flask equipped with a heating mantle, a thermometer, a condenser, to which is connected an ascarite $CO_2$ absorber and a Dry Ice acetone cold trap in series, is introduced about 100 parts of hexamethylene diisocyanate and about 5 parts of tertiary butyl alcohol. Heating is commenced and the temperature is permitted to rise slowly. At about 150° C., bubble formation and the evolution of carbon dioxide is noticed. At 195° to 200° C., brisk reaction is evident, and a liquid is noticed in the cold trap which has a hydrocarbon-like odor. The temperature in the reaction flask is maintained at 200–205° C. for 60 minutes and then cooled. The condensed liquid which has a hydrocarbon-like odor is isobutene.

The unreacted hexamethylene diisocyanate is separated from the biuret polyisocyanate by distillation. About 28.4 parts of product remain in the distillation flask which is a liquid biuret triisocyanate free of solids. The amine equivalent of the product is 197.1. This corresponds to an isocyanate content of 21.3%.

*Example 2*

The procedure of Example 1 is conducted with the exception that 1,2 di(isocyanato methyl)cyclobutane is used in place of hexamethylene diisocyanate. In place of tertiary butyl alcohol, 3-methyl-3-pentanol is used. The reaction, as evidenced by carbon dioxide evolution, starts at 95° C. The product is a liquid biuret polyisocyanate substantially free of solids.

*Example 3*

The procedure of Example 1 is conducted with the exception that about 0.001 part of concentrated sulfuric acid is added to the mixture of the hexamethylene diisocyanate and the tertiary butyl alcohol. The reaction, as evidenced by carbon dioxide and isobutylene evolution starts at 70° C. The product is the same as that in Example 1.

*Example 4*

Into a round bottom flask equipped with a heating mantle, a thermometer and a condenser is introduced about 100 parts of hexamethylene diisocyanate, about 100 parts of triethylene glycol diacetate, and about 15 parts of tertiary butyl alcohol. Heating is commenced and the temperature is permitted to rise slowly. At about 145° C., bubble formation and evolution of carbon dioxide is noticed. At 195° to 200° C., brisk reaction is evident. The temperature in the reaction flask is maintained at 200 to 205° C. for one hour and then cooled. The cooled solution may be used directly as a solution of the biuret polyisocyanate or may be concentrated by distillation of the solvent under reduced pressure before use.

It is, of course, to be understood that any of the aliphatic or alicyclic diisocyanates or tertiary alcohols mentioned above may be used in the examples for those specifically used therein. Further, the reaction may be conducted in any of the solvents mentioned or in the presence of acid catalysts.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A method of preparing biuret polyisocyanates which comprises reacting at least 2.5 mols of a member selected from the group consisting of aliphatic diisocyanates and alicyclic diisocyanates with one mol of a monohydric tertiary alcohol at a temperature of from about 70° C. to about 205° C.

2. The process of claim 1 wherein the diisocyanate is aliphatic.

3. The process of claim 1 wherein the diisocyanate is alicyclic.

4. The process of claim 1 wherein the diisocyanate is hexamethylene diisocyanate.

5. The process of claim 1 wherein the tertiary alcohol is tertiary butyl alcohol.

6. The process of claim 1 wherein the diisocyanate is 1,2-di(isocyanato methyl)cyclobutane.

7. The process of claim 1 wherein the diisocyanate is a mixture of 1-methyl-2,4-diisocyanato cyclohexane and 1-methyl-2,6-diisocyanato cyclohexane.

8. The process of claim 1 wherein the diisocyanate is bis(4-isocyanato cyclohexyl)methane.

9. The process of claim 1 wherein the reaction is carried out in a solvent.

10. A method of preparing biuret polyisocyanates which comprises reacting at least 2.5 mols of a member selected from the group consisting of aliphatic diisocyanates and alicyclic diisocyanates with one mol of a monohydric tertiary alcohol at a temperature of from about 150° C. to about 205° C.

11. A method of preparing biuret polyisocyanates which comprises reacting 9 mols of a member selected from the group consisting of aliphatic diisocyanates and alicyclic diisocyanates with one mol of a monohydric tertiary alcohol at a temperature of from about 150° to about 205° C.

12. A method of preparing biuret polyisocyanates which comprises reacting 9 mols of a member selected from the group consisting of aliphatic diisocyanates and alicyclic diisocyanates with one mol of a monohydric tertiary alcohol at a temperature of from about 150° to about 205° C. and separating the unreacted aliphatic diisocyanate from the biuret polyisocyanate.

References Cited

Saunders et al.: Chemical Reviews, 1948, vol. 43, p. 209 relied on.

Wagner: Chemical Abstracts, 1963, vol. 59, pp. 6406–6407.

CHARLES B. PARKER, *Primary Examiner.*

D. TORRENCE, *Assistant Examiner.*